US012026007B2

(12) United States Patent
Ono et al.

(10) Patent No.: US 12,026,007 B2
(45) Date of Patent: Jul. 2, 2024

(54) HOST DEVICE CONNECTED TO SLAVE DEVICE AND DATA TRANSFER SYSTEM WHEREIN VOLTAGE LEVELS ARE DRIVEN HIGH OR LOW BASED ON A PLURALITY OF CLOCK SIGNALS

(71) Applicant: Panasonic Intellectual Property Management Co., Ltd., Osaka (JP)

(72) Inventors: Tadashi Ono, Osaka (JP); Isao Kato, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 24 days.

(21) Appl. No.: 17/729,520

(22) Filed: Apr. 26, 2022

(65) Prior Publication Data

US 2022/0253092 A1 Aug. 11, 2022

Related U.S. Application Data

(63) Continuation of application No. PCT/JP2021/039261, filed on Oct. 25, 2021.

(30) Foreign Application Priority Data

Nov. 24, 2020 (JP) .................. 2020-193974

(51) Int. Cl.
- *G06F 1/10* (2006.01)
- *G06F 1/08* (2006.01)
- *G06F 9/4401* (2018.01)

(52) U.S. Cl.
CPC .................. *G06F 1/10* (2013.01); *G06F 1/08* (2013.01); *G06F 9/4416* (2013.01)

(58) Field of Classification Search
CPC ............ G06F 1/08; G06F 9/4416; G06F 1/10
See application file for complete search history.

(56) References Cited

U.S. PATENT DOCUMENTS

| 6,052,742 A * | 4/2000 | Kirinaka ................. G11C 5/143 710/10 |
| 8,321,697 B2 * | 11/2012 | Fujimoto ................. G06F 1/266 713/300 |
| 11,605,415 B2 * | 3/2023 | Fujimoto ......... G11C 29/50004 |
| 2007/0168652 A1 | 7/2007 | Mylly et al. |

(Continued)

FOREIGN PATENT DOCUMENTS

| JP | 2013-101636 | 5/2013 |
| JP | 2015-62131 | 4/2015 |

OTHER PUBLICATIONS

International Search Report dated Dec. 28, 2021 in corresponding International Application No. PCT/JP2021/039261.

(Continued)

*Primary Examiner* — Tammara R Peyton
(74) *Attorney, Agent, or Firm* — WENDEROTH, LIND & PONACK L.L.P.

(57) ABSTRACT

A data transfer system includes a slave device, and a host device that is connected to the slave device via at least a power supply line, a clock line, a command line, and a data line. A CMD line is continuously driven to a low level in a period from when the supply of at least a first clock is stopped to when the second clock is supplied (period form timing t5 to timing t6).

12 Claims, 6 Drawing Sheets

(56) References Cited

U.S. PATENT DOCUMENTS

| | | |
|---|---|---|
| 2010/0264753 A1 | 10/2010 | Toyama et al. |
| 2012/0032528 A1 | 2/2012 | Toyama et al. |
| 2012/0033717 A1 | 2/2012 | Toyama et al. |
| 2017/0192475 A1* | 7/2017 | Fujimoto ................ G06F 3/067 |
| 2020/0035289 A1 | 1/2020 | Fujimoto |

OTHER PUBLICATIONS

English translation of Office Action dated Oct. 28, 2023 in related Chinese Patent Application No. 202180006567.8.
Extended European Search Report issued Apr. 4, 2024 in corresponding European Patent Application No. 21881341.8.
Anonymous: "SD Specifications Part 1 Physical Layer Simplified Specification Version 5.00", SD Card Association, Aug. 10, 2016, pp. 1-230, XP055560630, Retrieved from the Internet: URL:http://www.sdcard.org [retrieved on Feb. 22, 2019].

\* cited by examiner

HOST DEVICE CONNECTED TO SLAVE
DEVICE AND DATA TRANSFER SYSTEM
WHEREIN VOLTAGE LEVELS ARE DRIVEN
HIGH OR LOW BASED ON A PLURALITY
OF CLOCK SIGNALS

TECHNICAL FIELD

The present disclosure relates to a host device, a slave device, and a data transfer system formed by these devices.

BACKGROUND ART

In recent years, as a storage medium (slave device), an SD card (registered trademark), CompactFlash (registered trademark), and the like have become widespread. The slave device forms a data transfer system by being connected to a host device such as a personal computer or a camera, and data is transmitted and received in the data transfer system.

PTL 1 discloses a technique for enabling a user to use a slave device as a bootable medium.

PTL 2 discloses a technique for switching an interface voltage used between a slave device and a host device.

CITATION LIST

Patent Literature

PTL 1: Unexamined Japanese Patent Publication No. 2015-62131

PTL 2: Unexamined Japanese Patent Publication No. 2013-101636

SUMMARY OF THE INVENTION

The technique described in PTL 1 does not assume a case where the slave device supports various operation modes.

The technique described in PTL 2 enables high-speed interface processing by switching the interface voltage. However, when this technique is used for boot data transfer as in the technique described in PTL 1, since an overhead of a switching time becomes relatively large, transfer efficiency of the boot data is deteriorated.

The present disclosure provides a host device, a slave device, and a data transfer system capable of enhancing transfer efficiency of boot data.

A data transfer system of the present disclosure is a data transfer system including a slave device and a host device connected to the slave device via at least a power supply line, a clock line, a command line, and a data line.

The host device supplies a power to the slave device via the power supply line after being connected to the slave device. The host device supplies a first clock having a first frequency and a first voltage value to the slave device via the clock line. The host device drives the command line to a low level after the command line is at a high level. The host device stops the supply of the first clock. The host device supplies a second clock having a second frequency and a second voltage value to the slave device via the clock line in a state where the data line is driven to a low level.

The slave device drives the data line to a high level within a first predetermined period after the supply of the second clock, and the slave device transmits boot data via the data line within a second predetermined period.

The host device performs activation processing by using the received boot data. The host device continues to drive the command line to the low level in a period from when the supply of the first clock is stopped until at least the second clock is supplied.

The present disclosure can provide the host device, the slave device, and the data transfer system capable of enhancing transfer efficiency of boot data.

DESCRIPTION OF EMBODIMENT

Exemplary embodiments will be described in detail below with reference to the drawings as appropriate. However, unnecessarily detailed description may be omitted. For example, the detailed description of already well-known matters and the redundant description of a configuration substantially identical to the already-described configuration may be eliminated. This is to avoid an unnecessarily redundant description below and to facilitate understanding of a person skilled in the art.

Note that the inventor of the present disclosure provides the accompanying drawings and the following description in order to allow those skilled in the art to fully understand the present disclosure, and does not intend to limit the subject matter as described in the appended claims.

1. Configuration of Data Transfer System

Figure 1:
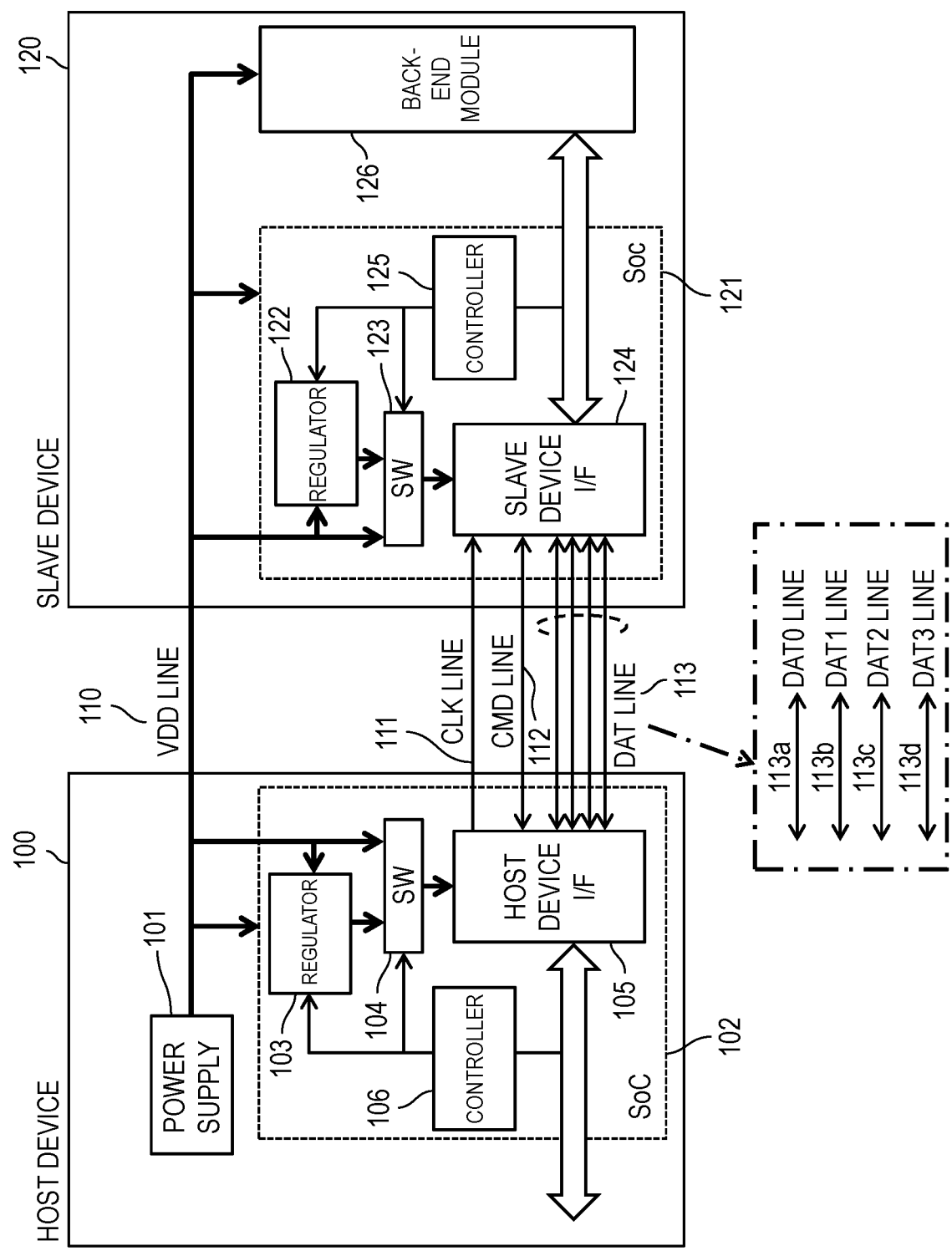
FIG. 1 is a block diagram illustrating a configuration of a data transfer system in which a slave device is connected to a host device.

FIG. 1 is a block diagram illustrating a configuration of a data transfer system in which slave device 120 is connected to host device 100. As illustrated in FIG. 1, host device 100 includes at least power supply 101 and SoC 102. SoC 102 includes at least regulator 103, SW 104 that is an electrical switch for selecting one of two power inputs, host device I/F 105, and controller 106. Note that regulator 103 can also be disposed outside SoC 102.

Host device 100 and slave device 120 are mechanically connected. Host device 100 is electrically connected to slave device 120 via VDD line 110 that is a 3.3 V power supply line.

Slave device 120 includes at least SoC 121 and back-end module 126. Back-end module 126 refers to a recording medium such as a flash memory, or a device such as a wireless communication module. SoC 121 includes at least regulator 122, SW 123, slave device I/F 124, and controller 125. Note that regulator 122 can also be disposed outside SoC 121. In the present exemplary embodiment, an SD card is used as an example of slave device 120. However, slave device 120 is not limited to the SD card. A compact flash (registered trademark) and a memory stick (registered trademark) are also examples of slave device 120.

Host device I/F 105 and slave device I/F 124 perform signal communication via a line including clock (CLK) line 111, command (CMD) line 112, and data (DAT) line 113. DAT line 113 includes four signal lines DAT0 line 113*a*, DAT1 line 113*b*, DAT2 line 113*c*, and DAT3 line 113*d*.

2. Operation of Data Transfer System

Hereinafter, a transfer operation of boot data executed when slave device 120 is connected to host device 100 will be described with reference to FIGS. 1 to 3.

Note that, in the present description, a signal being at a low level means that a voltage of the signal is 0 V or in the vicinity thereof. On the other hand, a signal being at a high level means that the signal has a higher voltage than the low level and can easily be distinguished from the low-level signal. A voltage value representing the high level can be determined according to the use of the data transfer system. In the present exemplary embodiment, a high voltage signal of 3.3 V and a low voltage signal of 1.8 V are used as examples of the voltage value representing the high level.

Figure 2:
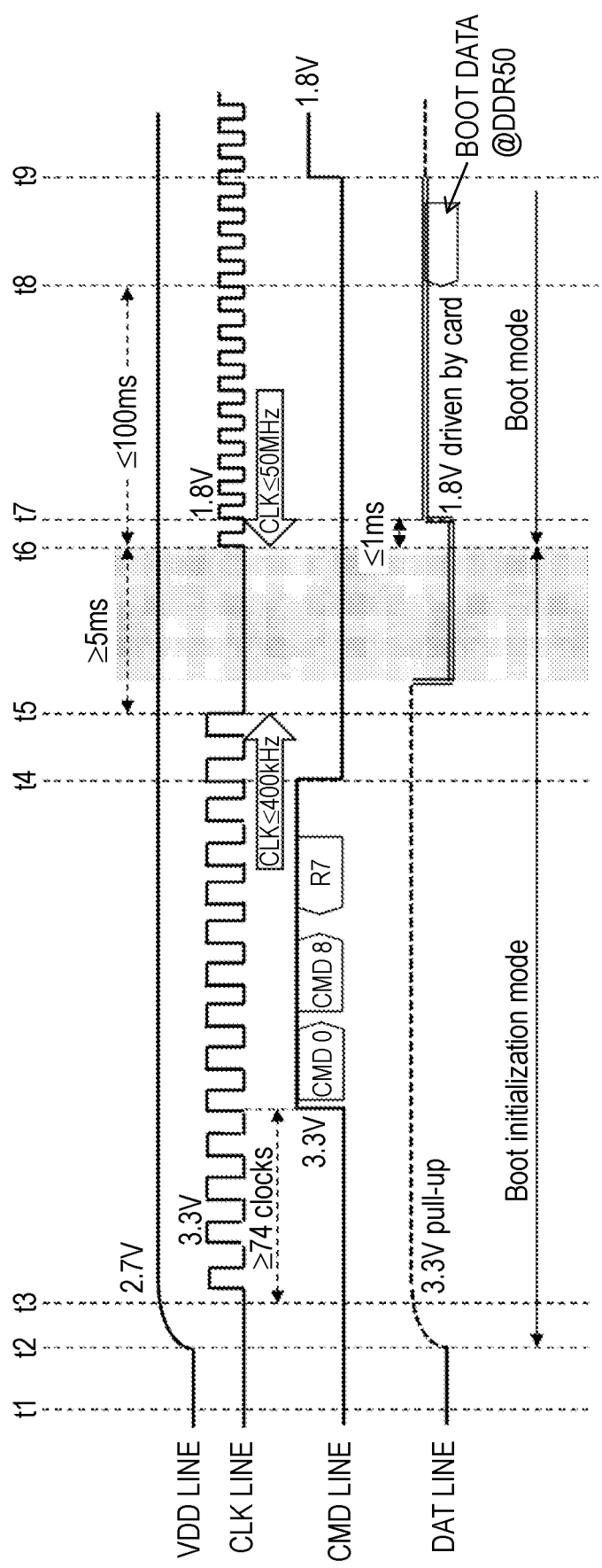
FIG. 2 is a schematic diagram of a timing chart after power activation in the host device and the slave device.

FIG. 2 is a schematic diagram of a timing chart after power activation in host device 100 and slave device 120.

Figure 3:
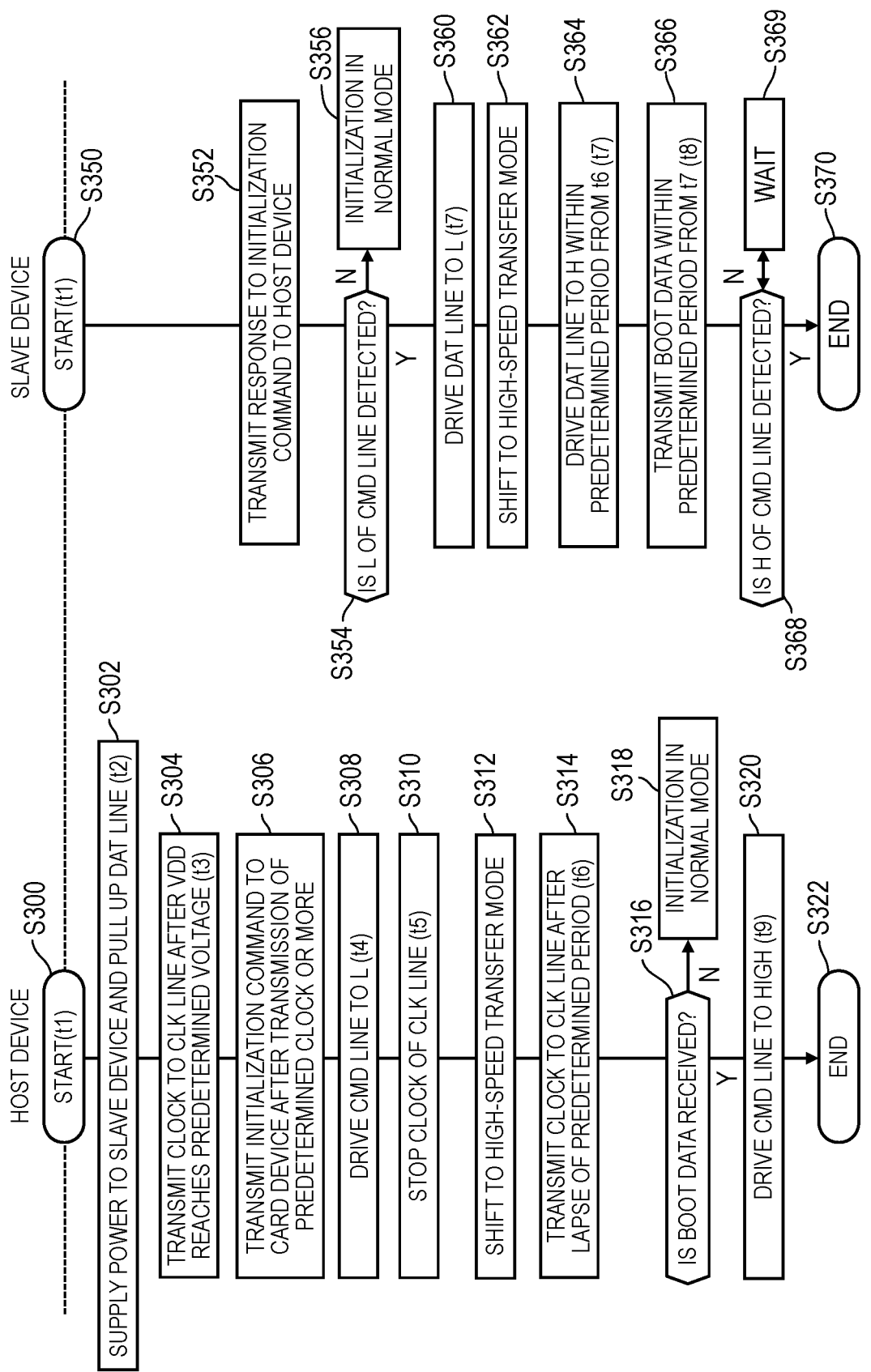
FIG. 3 is a schematic diagram of a sequence in the host device and the slave device.

FIG. 3 is a schematic diagram of a sequence in host device 100 and slave device 120.

Host device 100 starts the transfer operation of the boot data from timing t1 at which slave device 120 is connected (S300, S350). Host device 100 supplies 3.3 V power from power supply 101 at timing t2. 3.3 V power is supplied to SoC 102, regulator 103, SW 104, and slave device 120 via VDD line 110. Host device 100 pulls up DAT line 113 to 3.3 V (3.3 V pull-up in FIG. 2) at timing t2 (S302).

After the voltage applied to VDD line 110 reaches 2.7 V at timing t3, host device 100 sends a first clock to CLK line 111 (S304). A frequency of the first clock is less than or equal to 400 KHz (first frequency). A voltage value of the first clock is 3.3 V (first voltage value).

After the first clock is sent by a predetermined number of clocks (for example, 74 clocks or more), host device 100 sends an initialization command to a card device (S306). The initialization command is information sent from host device 100 to perform processing necessary for data transfer between host device 100 and slave device 120. Note that, in the present disclosure, the initialization command is used not only as a word meaning only a single command but also as a word meaning a set of a plurality of commands. As illustrated in FIG. 2, CMD 0 and CMD 8 which are commands defined in a standard related to the SD card are also examples of the initialization command.

Upon receiving the initialization command from host device 100, slave device 120 sends a response to the initialization command to host device 100 (S352). The response is information indicating that the slave device has recognized the command from host device 100. As illustrated in FIG. 2, R7 which is a response defined in the standard related to the SD card is an example of the response. There is no corresponding response in CMD 0.

Upon receiving the response from slave device 120, host device 100 drives CMD line 112 to a low level at timing t4 to request the reception of the boot data (S308). Note that, when host device 100 does not request the reception of the boot data described in the present exemplary embodiment or does not support the reception function of the boot data, CMD line 112 is not driven to the low level. Note that, in the present exemplary embodiment, the driving of each line may be performed by host device 100, slave device 120, or another external device. For example, a subject that drives CMD line 112 to the low level at timing t4 may be slave device 120. Hereinafter, as the present exemplary embodiment, a subject that drives each line will be defined and described for the sake of convenience.

Host device 100 stops sending the first clock to CLK line 111 at timing t5 subsequent to timing t4 (S310). This is an operation for sending a second clock to CLK line 111 in the future processing.

When it is not detected that CMD line 112 is driven to the low level (N in S354), slave device 120 performs a normal initialization operation defined by a standard of slave device 120 or the like (S356 (subsequent operation is omitted)).

When it is detected that CMD line 112 is driven to the low level (Y in S354), slave device 120 drives DAT line 113 to the low level after a predetermined period elapses (S360).

Host device 100 does not supply the clock to CLK line 111, and shifts a transfer mode of the host device to a high-speed transfer mode faster than a previous mode within a period (within a period hatched in FIG. 2) in which CMD line 112 and DAT line 113 are at the low level (S362). When the host device is a host device corresponding to the SD card as the slave device, an example of the high-speed transfer mode is a DDR50 mode. In the DDR50 mode, a bus width used for data transfer is extended from 1 bit to 4 bits. In the DDR50 mode, the clock used for data transfer is sampled by using both edges of the clock. In the DDR50, a voltage value of the clock used for data transfer is 1.8 V. In the DDR50, a frequency of the clock used for data transfer is 50 MHz at the maximum.

Slave device 120 also shifts a transfer mode to a high-speed transfer mode (DDR50 in the present exemplary embodiment) faster than a previous mode in a period (period hatched in FIG. 2) in which the clock is not supplied to CLK line 111 and CMD line 112 and DAT line 113 are at the low level (S312).

Host device 100 sends the second clock to CLK line 111 at timing t6 after a lapse of a predetermined period (for example, 5 ms) from timing t5 (S314). A frequency of the second clock is 50 MHz or more (second frequency). A voltage value of the second clock is 1.8 V (second voltage value).

Slave device 120 drives (1.8 V driven by card in FIG. 2) DAT line 113 to the high level (1.8 V) at timing t7 within a predetermined period (for example, 1 ms) from timing t6 (S364).

As illustrated in FIG. 2, a period from timing t2 to t6 is referred to as a boot initialization mode. A period after timing t6 is referred to as a boot mode.

Slave device 120 transmits the boot data to host device 100 via DAT line 113 at timing t8 within a predetermined period (for example, 100 ms) from timing t6 (S366).

Upon receiving the boot data (Y in S316), host device 100 drives CMD line 112 to the high level (1.8 V) at timing t9 (S320). Note that when the boot data is not received (N in S316), host device 100 performs initialization in a normal mode (S318). Here, the initialization in the normal mode means initialization in a low-speed mode as compared with the mode before transition. In the present exemplary embodiment, the initialization in the normal mode is initialization in a DS mode slower than the DDR50. In the DS mode, a bus width used for data transfer is reduced from 4 bits to 1 bit. In the DS mode, sampling of the clock used for data transfer is performed by using one edge of the clock. A clock frequency is 400 kHz at the maximum until the initialization of back-end module 126 is completed, and is 25 MHz at the maximum when data is transmitted and received via DAT line 113 after the initialization of back-end module 126 is completed.

Upon receiving the boot data, host device 100 ends transfer processing of the boot data (S322). Thereafter, host device 100 initializes back-end module 126 and activates host device 100 and the like using boot data.

Slave device 120 confirms that CMD line 112 is driven to the high level (S368, S370), and ends the transfer processing of the boot data (S370).

The exemplary embodiment has been described above as an example of the technique disclosed in the present application. However, the technique of the present disclosure is not limited thereto, and can be also applied to exemplary embodiments in which changes, replacements, additions, omissions, and the like are made.

For example, the processing of S306 and S352 may be omitted. That is, the issuance and the response of the initialization command may be omitted. In this manner, the boot data transfer processing can be performed at a higher speed.

The mode used for the transfer of the boot data may be a higher speed mode. For example, a mode of higher speed SDR104 may be used. In this mode, a clock frequency is up to 208 MHz. However, in this mode, in order to determine a sampling point of data received by host device 100, slave device 120 needs to transmit data called a tuning block to host device 100 before transmitting the boot data (details will be described later). In this manner, the boot data transfer processing can be performed at a higher speed.

The contents of S306 and S352 may be changed. For example, the transfer mode of the boot data can be variable according to the capability of the device by describing information specifying a type of the transfer mode of the boot data described above in the content of the initialization command (for example, CMD0, CMD8, or both CMD0 and CMD8).

Figure 4:
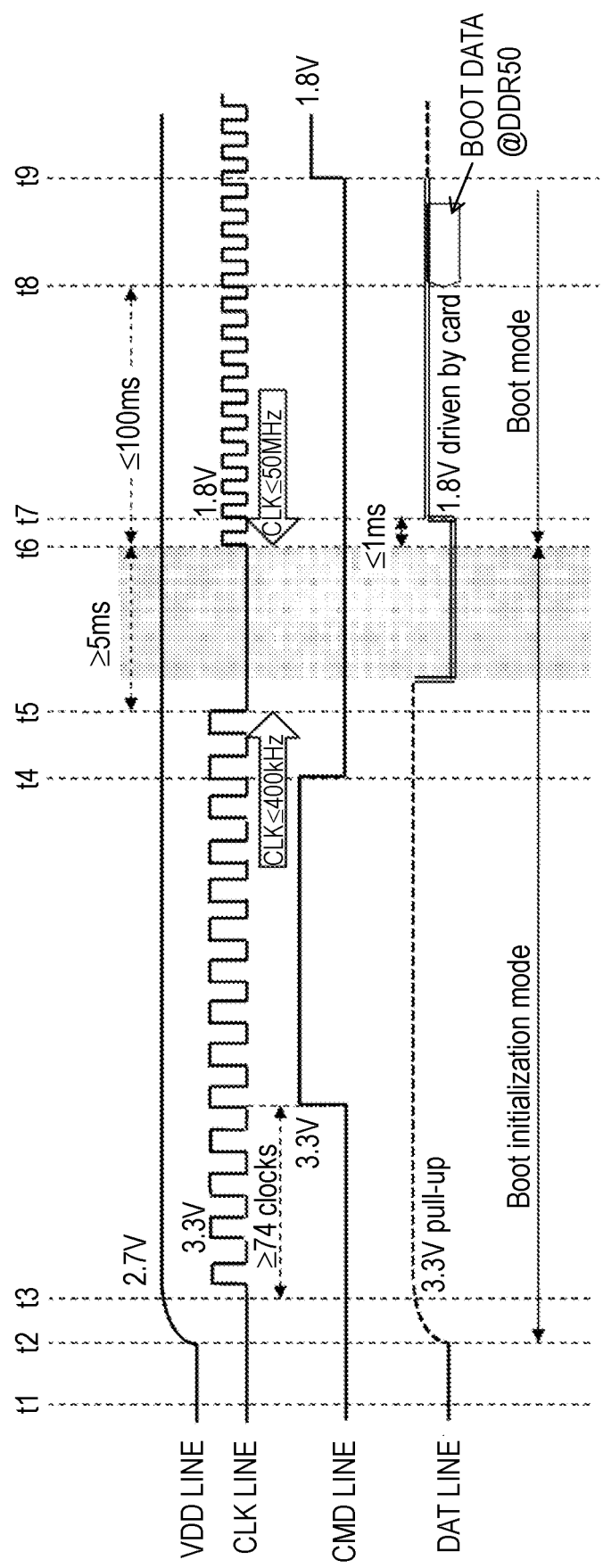
FIG. 4 is a schematic diagram of a timing chart illustrating a modification example of the present exemplary embodiment.
Figure 5:
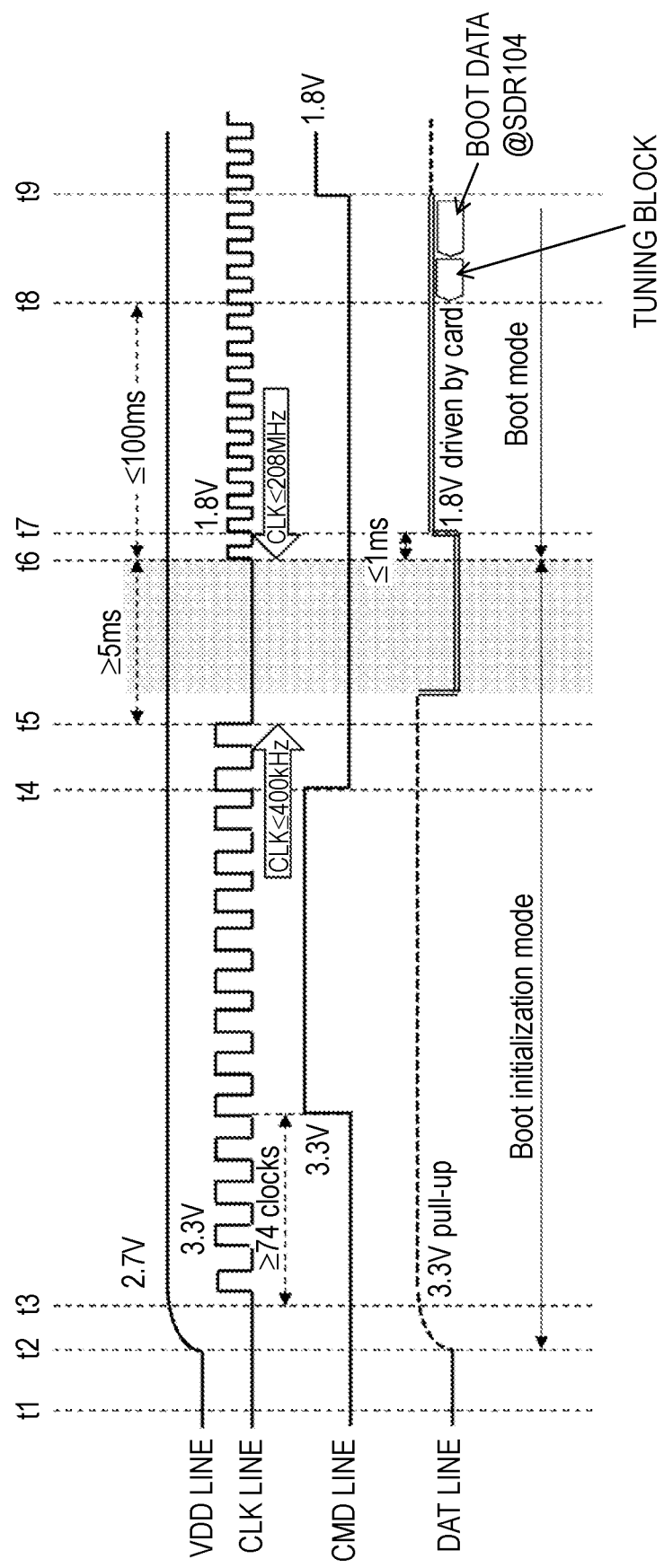
FIG. 5 is a schematic diagram of a timing chart illustrating a modification example of the present exemplary embodiment.
Figure 6:
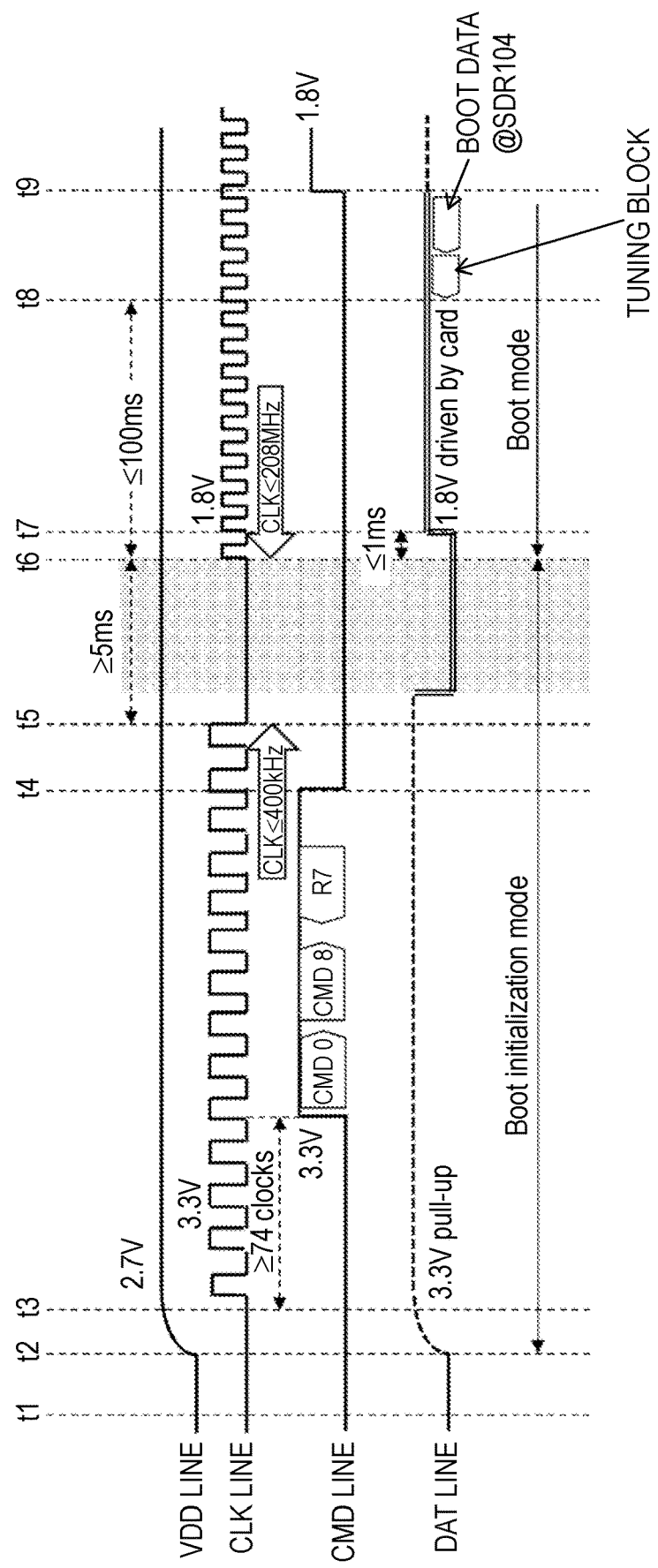
FIG. 6 is a schematic diagram of a timing chart illustrating a modification example of the present exemplary embodiment.

It goes without saying that the exemplary embodiment of the present disclosure includes combinations of variations of the above-described components. For example, FIGS. 4 to 6 are schematic diagrams of timing charts illustrating modification examples of the present exemplary embodiment. FIG. 4 illustrates an example in which the transfer mode is DDR50 while the issuance and the response of the initialization command are omitted. FIG. 5 illustrates an example in which the transfer mode is SDR104 while the issuance and the response of the initialization command are omitted. FIG. 6 illustrates an example in which information indicating that the transfer mode is SDR104 is described in CMD8 in the initialization command. Note that a timing chart illustrating an example in which information indicating that the transfer mode is DDR50 is described in CMD8 in the initialization command is substantially the same as that in FIG. 2 (the contents of CMD0 or CMD8 are different), and thus, the description is omitted.

As described above, when SDR104 is used as the transfer mode as illustrated in FIGS. 5 and 6, host device I/F 105 needs a process called tuning in order to correctly receive data. When the transfer mode is SDR104, slave device I/F 124 repeatedly sends a tuning block via DAT line 113 at a predetermined number of times (40 times as an example) at a predetermined interval (for example, 128 clock periods) prior to a boot code at timing t8. The tuning block is a data pattern defined in advance for tuning, and host device I/F 105 sequentially receives the tuning block while appropriately changing the sampling point of DAT line 113, and finds an appropriate sampling point. Data on DAT line 113 can be correctly received even when a high frequency clock such as the SDR104 is used by performing tuning.

3. Conclusion

In the present exemplary embodiment, CMD line 112 continues to be driven to the low level in a period (period from timing t4 to timing t6) from when the supply of the first clock is stopped to when at least the second clock is supplied. That is, the command is not exchanged between host device 100 and slave device 120 within the period. In the present exemplary embodiment, the boot data is transferred by the DDR50 or the SDR104 which is the higher speed mode without exchanging the command within the period. Thus, overhead time required for command transfer and command interpretation can be reduced. As a result, it is possible to increase the transfer efficiency of the boot data.

In the present exemplary embodiment, by t4, an agreement has been reached on the start of the boot data transfer processing and the transfer mode between host device 100 and slave device 120. Thus, at least until DAT line 113 is driven to the high level (timing t7) or until the boot data is transmitted (timing t8) after the supply of the first clock is stopped, CMD line 112 is continuously driven to the low level, and thus, the transfer efficiency of the boot data may be increased.

In the present exemplary embodiment, the example in which the initialization command is issued to the slave before the CMD line is driven to the low level after CMD line 112 is driven to the high level, and the information specifying the mode used to transfer the boot data is described in the initialization command has been described. In this manner, as described above, the transfer mode of the boot data can be variable according to the capability of the device.

INDUSTRIAL APPLICABILITY

The present disclosure can be applied to a slave device including an SD card, a compatible host device, and a data transfer system including the host device and the slave device.

REFERENCE MARKS IN THE DRAWINGS

100: host device
101: power supply
102: SoC
103: regulator
104: SW
105: host device I/F
106: controller
110: VDD line
111: CLK line
112: CMD line
113: DAT line
113a: DAT0 line
113b: DAT1 line
113c: DAT2 line
113d: DAT3 line
120: slave device
121: SoC
122: regulator
123: SW
124: slave device I/F
125: controller
126: back-end module

The invention claimed is:

1. A host device that is connected to a slave device via at least a power supply line, a clock line, a command line, and a data line,
wherein the host device
supplies a power to the slave device via the power supply line after being connected to the slave device,
supplies a first clock having a first frequency and a first voltage value to the slave device via the clock line,
drives the command line to a low level after the command line is at a high level,
stops the supply of the first clock,
supplies a second clock having a second frequency and a second voltage value to the slave device in a state where the data line is driven to a low level via the clock line,
performs, when the data line is driven to a high level within a first predetermined period after the supply of the second clock and boot data is received from the slave device via the data line within a second predetermined period, activation processing by using the received boot data, and
continues to drive the command line to the low level in a period from when the supply of the first clock is stopped to when at least the second clock is supplied.

2. The host device according to claim 1, wherein
the host device transmits an initialization command to the slave device after the command line is at the high level and before the command line is driven to the low level, and
the initialization command includes information specifying a mode used to transfer the boot data.

3. The host device according to claim 1, wherein the host device receives a tuning block including data used to read the boot data from the slave device before the boot data is received.

4. A slave device that is connected to a host device via at least a power supply line, a clock line, a command line, and a data line, wherein
a power is supplied from the host device to the slave device via the power supply line after being connected to the host device,
a first clock having a first frequency and a first voltage value is supplied from the host device to the slave device via the clock line,
the command line is driven to a low level after the command line is at a high level,
the supply of the first clock is stopped,
a second clock having a second frequency and a second voltage value is supplied from the host device to the slave device via the clock line in a state where the data line is driven to a low level,
the slave device drives the data line to a high level within a first predetermined period after the supply of the second clock, and the slave device transmits boot data via the data line within a second predetermined period, and
the command line is continuously driven to the low level in a period from when the supply of the first clock is stopped to when at least the second clock is supplied.

5. The slave device according to claim 4, wherein
the slave device receives an initialization command from the host device after the command line is at the high level and before the command line is driven to the low level, and
the initialization command includes information specifying a mode used to transfer the boot data.

6. The slave device according to claim 4, wherein the slave device transmits a tuning block including data used to read the boot data to the host device before the boot data is transmitted.

7. A data transfer system comprising a slave device and a host device, the host device being connected to the slave device via at least a power supply line, a clock line, a command line, and a data line, wherein
the host device supplies a power to the slave device via the power supply line after being connected to the slave device,
the host device supplies a first clock having a first frequency and a first voltage value to the slave device via the clock line,
the host device drives the command line to a low level after the command line is at a high level,
the host device stops the supply of the first clock,
the host device supplies a second clock having a second frequency and a second voltage value to the slave device via the clock line in a state where the data line is driven to a low level,
the slave device drives the data line to a high level within a first predetermined period after the supply of the second clock, and the slave device transmits boot data via the data line within a second predetermined period,
the host device performs activation processing by using the received boot data, and
the host device continues to drive the command line to the low level in a period from when the supply of the first clock is stopped to when at least the second clock is supplied.

8. The data transfer system according to claim 7, wherein
the host device issues an initialization command to the slave device after the command line is at the high level and before the command line is driven to the low level, and
the initialization command includes information specifying a mode used to transfer the boot data.

9. The data transfer system according to claim 7, wherein the host device receives a tuning block including data used to read the boot data from the slave device before the boot data is received from the slave device.

10. The host device according to claim 1, wherein the host device continues to drive the command line to the low level in a period from when the supply of the first clock is stopped to when at least the boot data is received.

11. The slave device according to claim 4, wherein the command line is continuously driven to the low level in a period from when the supply of the first clock is stopped to when at least the boot data is received.

12. The data transfer system according to claim 7, wherein the host device continues to drive the command line to the low level in a period from when the supply of the first clock is stopped to when at least the boot data is received.

* * * * *